United States Patent

Lautier et al.

[15] 3,668,570

[45] June 6, 1972

[54] ADAPTIVE SWITCHED FILTER ARRANGEMENT FOR USE IN RAPID FREQUENCY TRACKING

[72] Inventors: Alex Honore Lautier, Vence; Jean Louis Monrolin, Tourettes sur Loup, both of France

[73] Assignee: International Business Machines Corporation, Armonk, N.Y.

[22] Filed: Dec. 4, 1970

[21] Appl. No.: 95,307

[52] U.S. Cl. ..............................333/70 A, 328/155, 328/167

[51] Int. Cl. ..............................H03h 7/10

[58] Field of Search......................333/17, 70, 70 A; 328/138, 328/155, 167; 330/107, 109

[56] References Cited

UNITED STATES PATENTS 3,403,345 9/1968 Frank et al. ......................333/70 A X

*Primary Examiner*—Paul L. Gensler
*Attorney*—Hanifin & Jancin and Robert Bruce Brodie

[57] ABSTRACT

An adaptive switched filter arrangement formed from two switched filters to each of which is applied the same input signal. The first switched filter is switched at an independent predetermined frequency. The second switched filter, however, is tuned by the output frequency extracted by the first filter. This minimizes phase tracking time and cancels systematic phase error.

6 Claims, 4 Drawing Figures

INVENTORS
ALEX H. LAUTIER
JEAN L. MONROLIN
BY Robert Bruce Brodie
ATTORNEY

ADAPTIVE SWITCHED FILTER ARRANGEMENT FOR USE IN RAPID FREQUENCY TRACKING

BACKGROUND OF THE INVENTION

This invention relates to an arrangement of narrow band-pass filtering devices and more particularly to an arrangement of N-path type filters or switched filters for use in, for example, rapid frequency tracking.

Switched filters are known in the prior art as tunable very high Q band-pass filters of the active circuit type. These are described, for example, in Electronics, July 24, 1967 at pages 90–100 in an article entitled "Digital Filters with IC's Boost Q Without Inductors" by William R. Hardin. Also the principles are set forth in Electrical Design News, June 1, 1967, published by Rogers Publishing Company of Denver, Colorado in "A Novel Approach to Wave Filters" by Christopher Vale. Lastly, an elaborate mathematical exposition is revealed in the Bell System Technical Journal, pages 1,321–1,350, September, 1960 in "An Alternative Approach to the Realization of Network Transfer Functions" by L. E. Franks et al.

In the Hardin reference, a simple shunt switched filter is shown formed by connecting several capacitors in parallel to segments of a rotary switch. The circuit is returned to ground through the switch. An output voltage is developed across the capacitor and switch segment grounded at any one instant of time. An applied time varying input voltage that is not synchronized with the speed of rotation of the switch $f_s$ will develop a voltage across the switched capacitors averaging out to zero. However, any input signal having the same period of repetition as to switch wiper will charge up the capacitors and thus yield an output. Given identical capacitors in such a switch it can be shown, that the filter has a bandwidth of $\Delta f = 1/RC$ centered as $f_s$, with a $Q \cong f_s/\Delta f$.

As pointed out in the Vale reference, a simple bandpass filter can be constructed from three capacitors. In the first case where capacitance $C = 0.1$ $\mu$f was used, a $Q = 35$ was obtained for a switching frequency $f_s$ = 1,250 Hz and a bandwidth $\Delta f = 35$ Hz. $\Delta f$ was measured between the 3 db points on the relative magnitude-frequency characteristic of the device. Upon capacitance $C$ being increased to 0.47 $\mu$f, a $Q = 166$ was obtained for the same switching frequency $f_s$ = 1,250 Hz and a $\Delta f$ = 7.5 Hz. Extremely high $Q$'s can also be obtained if the filter switching speed is substantially increased, the shape of the filter characteristic remaining constant. However, switched filters generally induce a phase shift between the input and output signals due to the inevitable difference between the nominal frequency of the filter and the input signal.

It is accordingly, an object of the present invention to provide a switched filter device delivering an output signal with a phase shift equal to zero with respect to the incident signal in steady state.

It is yet another object of the present invention to provide a device enabling simple and quick recovery of a given frequency with a minimum phase error in transient state.

It is still further another object of the present invention to provide an adaptive device enabling frequency tracking.

SUMMARY OF THE INVENTION

The present invention comprises two switched filters, both receiving the incident signal at their respective inputs. The first switched filter is switched by a fixed frequency source close to the frequency to be extracted. The second switched filter is controlled by the frequency actually extracted by the first switched filter.

The output signal of the first filter presents a systematic phase error $\phi$ proportional to the frequency shift between the input signal and the control signal. The phase shift involves, at the generator associated to the second switched filter, a frequency shift between the signal received by the second filter, which is the incident signal, and the signal controlling this second filter, this frequency shift being proportional to the derivative of phase shift $\phi$. The frequency controlling the first filter being fixed in steady state, phase shift $\phi$ is constant and its derivative is null. Thus, the second filter is tuned on the frequency received and its output signal does not show any systematic phase shift.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
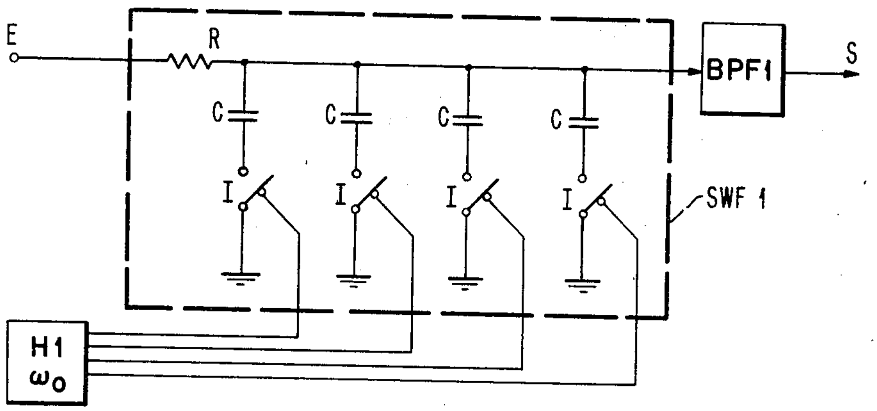
FIG. 1 PRIOR ART
FIG. 1 shows a standard shunt switched filter.

The standard switched filter shown in FIG. 1 comprises a resistor R, one terminal of which receives the incident signal and the other terminal of which is connected, to several capacitors. The values of the capacitors may be different. The resistor may also be coupled to the input of a BPF1 standard band-pass filter. For simplicity, this shunt type switched filter is limited to four capacitors with the same value $C$. These capacitors are grounded in turn through switches I following a cycle determined by generator H1 controlled by a fixed pulse signal $\omega_0$. The operation of such a filter is described in detail in the previously named Hardin and Vale references. The following mathematical analysis is intended to demonstrate the systemic phase shift error in this type of filter. Let us apply at the filter input a unit step cosine signal $x(t)$ such that $$x(t) = Y(t)\cos(\omega t + \phi)$$

where $Y(t)$ is the Heaviside function or the unit step.

$\omega$ is the signal pulse repetition frequency in radians per second.

$\phi$ is the constant phase shift introduced by the transmission.

The transfer function of the switched filter may be represented as $$F = \frac{1}{2} e^{-t/\theta} \cos \omega_0 t = \frac{Y(t)}{x(t)}$$

where $\theta = NRC$ $N$ is the number of capacitors

The output signal $Y(t)$ of such a filter is given by the following formula:

$$Y(t) = x(t) \oplus F$$

where $\oplus$ = convolution operator

Thus $$Y(t) = x(t) \oplus F = \int_{-\infty}^{+\infty} m(x - F) g(F) dF$$

where $m$ and $g$ are generalized functions:

$$y(t) = \int_{-\infty}^{+\infty} \left( Y(t-\lambda) \cos[\omega(t-\lambda) + \phi] \frac{Y(\lambda)}{2} e^{-\lambda/\theta} \cos \omega_0 \lambda \right) d\lambda$$

or $$y(t) = \frac{1}{2} \int_0^t (\cos[\omega(t-\lambda) + \phi] e^{-\lambda/\theta} \cos \omega_0 \lambda) d\lambda$$

That is, the repetitive operation of the switched filter resembles the mathematical convolution operator acting upon the input signal waveform.

This integral allows the sum of two terms for solution: a first term $P$ which represents the output signal in steady state and a second term $T$ which represents the output signal in transient state.

$$(1)\quad P=\frac{e^{j(\omega t+\phi)}}{2}\left[\frac{1}{\frac{1}{\theta}-j(\omega_o-\omega)}+\frac{1}{\frac{1}{\theta}+j(\omega_o+\omega)}\right]+\frac{e^{-j(\omega t+\phi)}}{2}\left[\frac{1}{\frac{1}{\theta}+j(\omega_o-\omega)}+\frac{1}{\frac{1}{\theta}-j(\omega_o+\omega)}\right]$$

which can be represented in the following form:

$$P=K\cos(\omega t+\phi+\phi 1)\qquad(2)$$

where $K$ = constant $\phi 1$ = Constant phase shift due to the frequency shift between the incident signal and pulse control signal $\omega_o$.

$$(3)\quad T=-\frac{e^{-t/\theta}}{\frac{1}{\theta^2}+(\omega_o-\omega)^2}\left[(\omega_o-\omega)\sin(\omega_o t+\phi)+\frac{1}{0}\cos(\omega_o t+\phi)\right]-\frac{e^{-t/\theta}}{\frac{1}{\theta^2}+(\omega_o+\omega)^2}\left[(\omega_o+\omega)\sin(\omega_o t-\phi)+\frac{1}{\theta}\cos(\omega_o t-\phi)\right]$$

If $\omega\to\omega_o$ to first order, this expression can be represented in the following form:

$$(4)\quad T\neq\theta e^{-t/\theta}\cos(\omega_o t+\phi)$$

Figure 2:
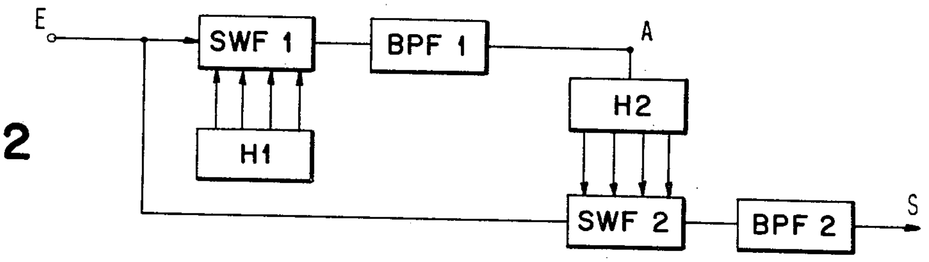
FIG. 2 shows an embodiment of the present invention.

Referring now to FIG. 2, there is an example of a quick response switched filter in accordance with the present invention. This device comprises a first standard switched filter SWF1 controlled by a pulse generator H1 controlled by a fixed pulsation signal $\omega_o$ close to the pulsation of the signal to be extracted, followed by a standard band-pass filter BPF1. The output of filter BPF1 is connected to the input of pulse generator H2 associated to switched filter SWF2, the frequency controlling this generator H2 being the frequency actually extracted by filter SWF1. The input of filter SWF2 receives the incident signal and its output is connected to a second standard band-pass filter BPF2 the output of which is the output of the device.

Let use suppose that the input signal of the device is in the following form:

$$e=Y(t)\cos(\omega t+\phi)$$

a frequency shift between the incident signal and the frequency controlling generator H1 will cause, in steady state, a phase shift $\phi 1$ to appear at the output of filter SWF1 in accordance with the indication given before.

Thus, at point A, we have a signal of the following form.

$$X_1=K\cos(\omega t+\phi_1)$$

To first order, $\phi 1$ can be represented in the following form:

$$(5)\quad \phi 1=\phi o(\omega-\omega_o)\qquad \phi o=F(\theta 1)=\text{constant}$$

$$\theta 1=\theta \text{ particular of filter } SWF1$$

The phase shift $\phi 1$ causes, a generator H2, a shift between the incident frequency and the frequency controlling generator H2. If $\omega 2$ is the pulsation of the signal controlling generator H2, we will have:

$$\omega 2-\omega=K'(d\phi 1/dt)\qquad(6)$$

In Formula (5) above, $\phi o$, $\omega$ and $\omega_o$ being constant, phase shift $\phi 1$ is constant, and from Formula (6), we have:

$$\omega 2=\omega$$

At filter SWF2, if we transpose Formula (5) at $\phi 2$ phase shift produced by SWF2, $$\phi 2=\phi' o(\omega-\omega 2)=0\qquad \phi'(o)=F(\theta 2)=\text{constant}$$

$$\theta 2=\theta$$

To first order, therefore the device extracts the desired frequency without introducing systematic phase shift in steady state.

Up to now, we have considered the steady state only; let us consider the phenomena in transient state now.

At point A, the pulsation of the signal delivered by filter SWF1 will tend toward pulsation $\omega$ which is obtained in steady state at this same point.

Therefore, SWF2 is a switched filter, the incident signal of which has $\omega$ for pulsation, since this filter directly receives the incident signal and the signal of which controlling the generator associated to this same filter has a pulsation which tends toward $\omega$.

Figure 3:
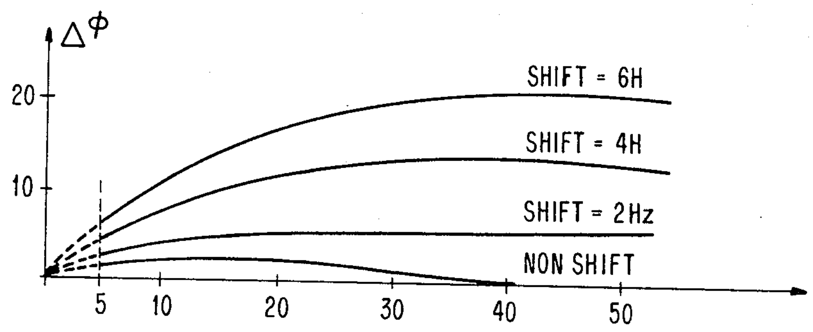
FIGS. 3 and 4 show the phase shift variation in the case of a standard switched filter and in the case of the device of the present invention.
Figure 4:
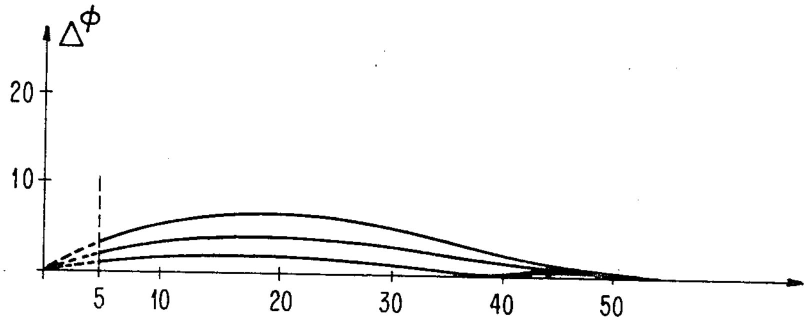

FIGS. 3 and 4 show the phase responses at the output of filter SWF1 and at the output of filter SWF2 according to the time and shift between the frequency of the incident signal and a frequency of 2,800 Hz controlling generator H1.

The use of two switched filters enables cancellation of the phase error to first order; with the same principle, the use of an additional switched filter controlled by the frequency isolated by filter SWF2 and receiving the incident signal at its input will permit the cancellation of the phase error to second order.

Therefore, the total number of switched filters used will depend on the accuracy required.

It is to be noted that the great adaptability of this device enables tracking of the incident signal frequency with a great selectivity. In fact, if we determine a certain bandwidth for filter SWF1 and a narrower bandwidth for filter SWF2, the latter being permanently tuned on the incident signal frequency, will enable tracking of this frequency within the range defined by filter SWF1.

It is to be noted that although we have used a switched filter as first filter (SWF1) in this invention, any other filtering device giving a systematic phase shift such as "phase locked oscillator" could be used as the first filter.

A such device will be advantageously used in data transmissions either for the correct setting of a clock or for the recovery of carrier frequencies on other similar systems.

This description of the present invention has been given as an example and it will be understood that various changes in form and details may be made therein without depart from the spirit and scope of the invention.

What is claimed is:

1. A filter arrangement for recovering the repetition frequency $\omega$ of a communication signal comprising:

a phase locked oscillator of frequency $\omega_o$ responsive to the communication signal for producing a signal of frequency $\omega_1$ when $\omega$ is within the oscillator frequency passband; and a switchable filter also responsive to the communications signal and being switched at the $\omega_1$ rate by the oscillator output for producing an output when $\omega$ lies within the filter frequency passband.

2. A filter arrangement according to claim 1, wherein:

a switchable filter defines a frequency band-pass characteristic where $\omega_1$ is the center frequency, $\omega_1 + 1/\tau$ is the upper limit, $\omega_1 - 1/\tau$ is the lower limit, and $\tau$ is the filter time constant.

3. A filter arrangement according to claim 1 wherein:

the bandwidth of the switchable filter is less than the phase locked oscillator.

4. A filter arrangement for recovering the repetition frequency $\omega$ of a communications signal comprising:

a source of clock signals of frequency $\omega_o$;

a first switchable filter responsive to the communications signal, said filter being switched by the clock source at the $\omega_o$ rate and defining a frequency band-pass characteristic where $\omega_o$ is the center frequency, $\omega_o + 1/\tau_1$ is the upper limit, $\omega_o - 1/\tau_1$ is the lower limit, and $\tau_1$ is the filter time constant, said filter further producing a signal frequency $\omega_1$ when $\omega$ lies within the first filter frequency passband; and a second switchable filter responsive to the communications signal, said filter being switched by the first filter output at the $\omega_1$ rate and defining a frequency band-pass characteristic where $\omega_1$ is the center frequency, $\omega_1 + 1/\tau_2$ is the upper limit, $\omega_1 - 1/\tau_2$ is the lower limit; and $\tau_2$ is the filter time constant, for producing an output when $\omega$ lies within the second filter frequency passband.

5. A filter arrangement according to claim 4 wherein:

$$\tau_1 < \tau_2.$$

6. A filter arrangement for recovering sinusoidal carrier signal of frequency $\omega_o$ as shifted by frequency of $\epsilon$, comprising:

a source of clock signals of frequency $\omega_o$;

a first switchable filter responsive to the shifted sinusoidal carrier signal of frequency $\omega_o + \epsilon$ and switchable by the clock signal source at the $\omega_o$ rate for producing a sinusoidal signal output of $\omega_o + \epsilon + \phi$, $\phi$ being the first filter phase shift; and a second switchable filter responsive to the shifted carrier signal switchable at the $\omega_o + \epsilon + \phi$ rate by the first filter output for passing the $\omega_o + \epsilon$ signal.

* * * * *